United States Patent [19]

Morin

[11] 4,412,660
[45] Nov. 1, 1983

[54] FOREST RESIDUES SWEEPER

[76] Inventor: Armand Morin, 1034 - 3rd Ave., Val d'Or, Province of Quebec, Canada, J9P 1T6

[21] Appl. No.: 250,110

[22] Filed: Apr. 2, 1981

[30] Foreign Application Priority Data

Dec. 11, 1980 [CA] Canada ............................... 366587

[51] Int. Cl.³ ............................................. B02C 9/04
[52] U.S. Cl. ........................... 241/101.7; 56/13.9; 56/504; 241/222; 241/243
[58] Field of Search ............... 241/101.7, 222, 223, 241/243, 152 A, 158; 56/13.9, 504, 16.2, 15.9

[56] References Cited

U.S. PATENT DOCUMENTS

| | | |
|---|---|---|
| 2,836,023 | 5/1958 | Caldwell |
| 2,858,867 | 7/1954 | Elofson |
| 3,651,845 | 3/1972 | Propst |
| 3,850,375 | 11/1974 | Ford ............................... 241/101.7 |
| 3,874,602 | 4/1975 | Ciriegio |
| 3,916,605 | 11/1975 | Richard et al. ............... 241/101.7 X |
| 3,944,147 | 3/1976 | Pletcher |
| 3,989,198 | 11/1976 | Blasko |
| 4,037,799 | 7/1977 | Urban |
| 4,098,311 | 7/1978 | Larsson |
| 4,157,164 | 6/1979 | Helm et al. |
| 4,253,295 | 3/1981 | Krepper ........................... 56/16.2 X |

FOREIGN PATENT DOCUMENTS

| | | |
|---|---|---|
| 1024044 | 1/1978 | Canada |
| 1053127 | 4/1979 | Canada |

*Primary Examiner*—Mark Rosenbaum
*Assistant Examiner*—Timothy V. Eley

[57] ABSTRACT

A machine particularly adapted to form a sweeper for the forest residues left on the ground after the bigger trees have been cut and removed from a forest. This forest residues sweeper also features its adaptability to uneven ground and obstacles, its arrangement to successively rather than simultaneously cut branches or small tree trunks, and its discharging arrangement to load the chipped or sheared forest residues into a wagon for use elsewhere as wood chips. This forest residues sweeper comprises sweeper drums with catching fingers arranged to lift the forest residues off the ground and shear them against fixed abutments or cutters. A chipper behind the sweeper drums then reduces the sheared residues into chips and a blower and duct are arranged to load the chips into a wagon.

2 Claims, 4 Drawing Figures

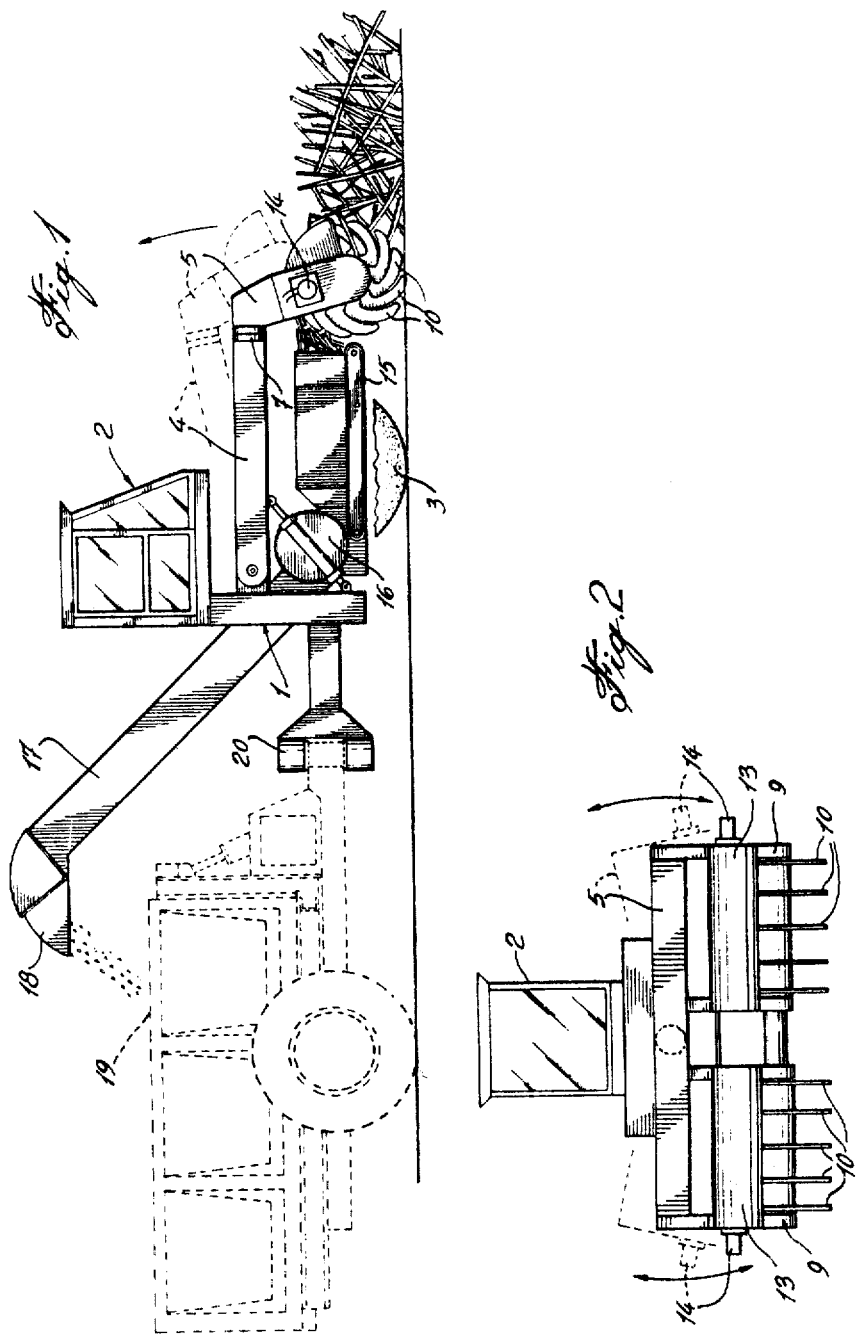

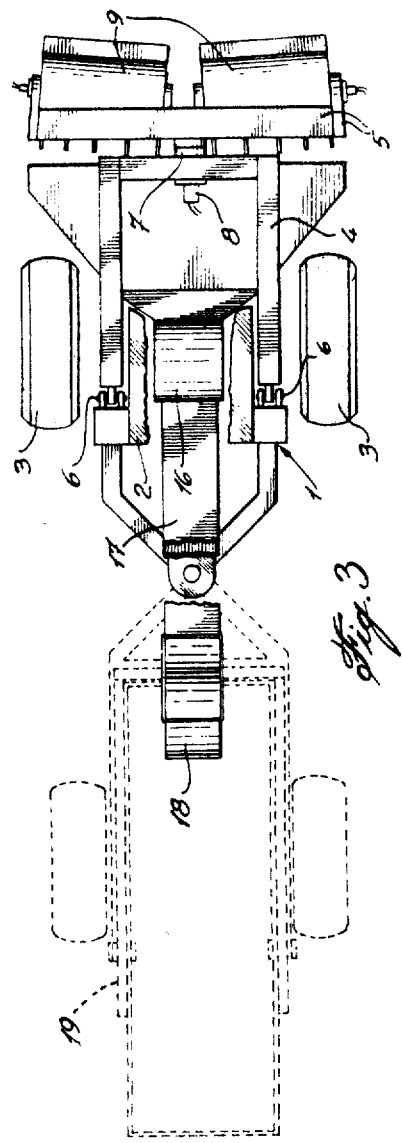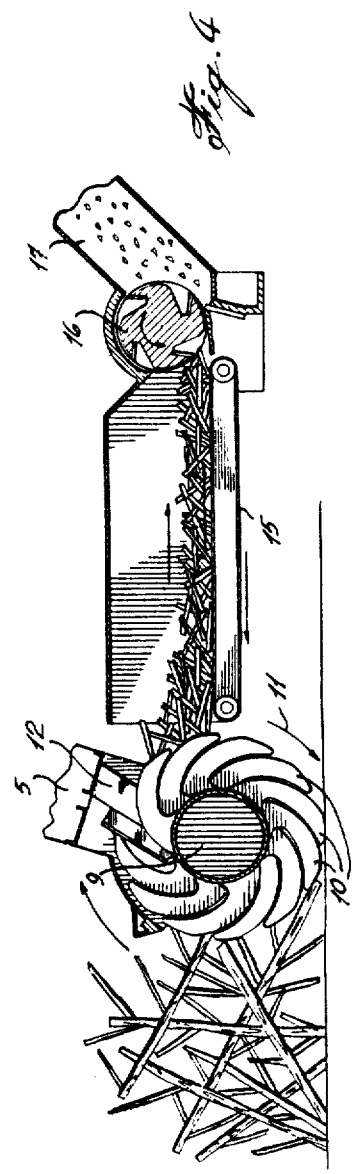

FOREST RESIDUES SWEEPER

This invention relates to a machine for cleaning a forest from forest residues, such as tree remnants, branches, and small trees after the bigger trees have been removed. More particularly, this invention relates to a machine adapted to sweep, cut and chip the above-mentioned forest residues left in a forest after the larger trees have been removed.

The bigger trees in a forest are now currently harvested by cutting down all the trees in a forest and pulling out only those of commercial interest. This results in a lot of forest residues, such as branches and small trees remaining in jumble on the ground and eventually hindering reforestation.

It is a general object of the present invention to provide a machine adapted to remove the jumbles of forest residues from a cut forest for readily reforestation of the site.

It is a more specific object of the present invention to provide a machine adapted to sweep the forest residues and to shear and chip them for readily removal and use elsewhere in the form of wood chips.

It is another specific object of the present invention to provide a forest residues sweeper that is particularly adapted for efficient operation in a cut forest irrespective of the ground irregularities and obstacles.

It is a further object of the present invention to provide a forest residues sweeper that is adapted to successively cut or shear the branches and small tree trunks to avoid excessive demand on ruggedness and power for the machine.

It is still another object of the present invention to provide a forest residues sweeper that is adapted to fill a wagon and to thus move the chips or cut forest residues out of the cut forest to leave the ground ready for reforestation.

The above and other objects and advantages of the present invention will be better understood with reference to the following detailed description of a preferred embodiment thereof which is illustrated, by way of example, in the accompanying drawings, in which:

FIG. 1 is a side elevation view of a forest residues sweeper according to the present invention;

FIGS. 2 and 3 are front and top views respectively of the same forest residues sweeper; and FIG. 4 is a cross-sectional view taken longitudinally of the same forest residues sweeper and showing the front portion thereof.

The illustrated forest residues sweeper comprises a fixed frame section 1 adapted to form a vehicle frame supporting a cab 2, of any appropriate construction, to house an operator. The vehicle frame 1 is carried on a wheel and axle assembly represented by the wheels 3. The forest residues sweeper includes a first articulated frame section, or member 4, and a second articulated frame section, or member 5. The first articulated frame member 4 is of U shape planar outline, as shown in FIG. 3, with its opposite free ends pivoted at 6 to the fixed frame section 1. Thus, the first articulated frame member is pivotable about a transverse axis relative to the longitudinal direction of motion of the sweeper. A swivelling connection 7 interconnects the articulated frame members 4 and 5 for swivelling of the latter about an axis extending in the direction of motion. Thus, the second articulated frame member 5 is tiltable transversely relative to the vehicle frame and first articulated frame member 4. A motor 8 is preferably connected to the swivelling connection to positively tilt the frame member 5, whenever desired.

The frame member 5 is provided with two pairs of depending legs, each rotatively holding a sweeper drum or roll 9. The two sweeper drums 9 longitudinally extend crosswise relative to the direction of motion, extend end to end and are skewed relative one to the other, as seen in FIG. 3. Thus, the inner end of each drum 9 is positioned backward relative to the corresponding outer end to induce the forest residues to be trapped inward toward the adjacent inner ends of the sweeper drum.

Each sweeper drum 9 is provided with a plurality of rows of catching fingers 10, such that the latter are circumferentially spaced from each other at least in each row to successively bight and shear or cut a tree trunk or branch. Each catching finger is substantially or approximately arc-shaped to define a curved cutting leading edge relative to the direction of rotation indicated by the arrow 11 in FIG. 4. A series of abutments or cutters 12 are fixedly secured to the frame member 5 and spaced apart from each other in the axial direction of the drums 9 and in interdigitation with the rotating and cutting fingers 10. The elements 12 do not need to be provided with a cutting edge. A shroud 13 overlies the front of each sweeper drum 9. Each sweeper drum is driven by a motor 14 in counter-rotation relative to the operative rotation of the wheel and axle assembly.

The sheared or cut forest residues are meant to be loaded in a wagon to clear or clean the ground and also to reduce them into wood chips for use elsewhere. For that purpose, an endless conveyor 15 is carried by the vehicle frame 1 behind the sweeper drum to rearwardly convey the sheared forest residues. A chipper 16, of any appropriate type, is mounted on the vehicle frame 1 in cooperation with the rear of the endless conveyor to chip the sheared forest residues that are conveyed to it by the conveyor 15. The chipper 16 also forms a blower at the lower inlet end of a discharging duct 17 to expel the chips outwardly through a spout 18 and thus load an underlying wagon 19, of any appropriate type. The vehicle frame 1 is also provided with a hitch 20 to pull the wagon along while loading it.

What I claim is:

1. A forest residues sweeper for collecting, cutting and chipping tree branches, small trees and the like forest residues lying on a forest floor after removal of bigger trees, said sweeper comprising a first frame having a front portion and a rear portion, a single pair of ground-engaging and power-operated driving wheels supporting said first frame about an axis transverse to said first frame, a hitch carried by said rear portion for hitching and pulling a wheeled wagon behind said sweeper, a second frame extending over the first frame and pivoted to the the first frame about a second axis substantially parallel to said first axis and located rearwardly of and above the first frame, power means to pivot said second frame about said second axis upwardly and downwardly relative to said first frame, a third frame extending transversely of and in front of said first frame and having a central portion pivoted to the front end of said second frame about a third axis extending longitudinally of said first frame and in the plane of said second frame for tilting movement of said third frame relative to said second frame, said third frame carried by said second frame and pivotable therewith about said second axis, a pair of sweeper drums rotatably carried by said third frame in spaced end-to-end relationship for rotation about their respective drum axes, said drum axes extending transversely of said first frame and mutually inclined in a horizontal plane with the outer ends of said sweeper drums forwardly offset relative to their inner center ends, catching fingers secured to and projecting from said sweeper drums, abutment fingers secured to said third frame and interdigitated with said abutment fingers, power means for rotating said sweeper drums in a direction opposite that of said ground-engaging wheels, whereby forest residues are collected by said fingers and cut between said fingers and said abutment members, a power-operated wood chipper carried by a rear portion of said first frame, conveyor means carried by said first frame longitudinally thereof and extending between said sweeper drums and said wood chipper, and chute means carried by said first frame and in communication with an outlet of said wood chipper for discharging wood chips into said wagon.

2. A forest residues sweeper as claimed in claim 1, further including power means for tilting said third frame relative to said second frame about said third axis.

* * * * *